United States Patent
Ma et al.

(10) Patent No.: US 11,087,418 B2
(45) Date of Patent: Aug. 10, 2021

(54) METHOD FOR IMPLEMENTING O2O CATERING OPERATION, SERVER AND SMART COOKING DEVICE

(71) Applicant: SHENZHEN FANLAI TECHNOLOGY CO., LTD., Guangdong (CN)

(72) Inventors: Long Ma, Guangdong (CN); Zirong Huang, Guangdong (CN)

(73) Assignee: SHENZHEN FANLAI TECHNOLOGY CO., LTD., Shenzhen (CN)

(*) Notice: Subject to any disclaimer, the term of this patent is extended or adjusted under 35 U.S.C. 154(b) by 91 days.

(21) Appl. No.: 16/331,539

(22) PCT Filed: Aug. 14, 2017

(86) PCT No.: PCT/CN2017/097339
§ 371 (c)(1),
(2) Date: Mar. 8, 2019

(87) PCT Pub. No.: WO2018/232909
PCT Pub. Date: Dec. 27, 2018

(65) Prior Publication Data
US 2020/0184578 A1 Jun. 11, 2020

(30) Foreign Application Priority Data
Jun. 23, 2017 (CN) .......................... 201710487734.0

(51) Int. Cl.
G06Q 20/12 (2012.01)
A47J 27/04 (2006.01)
(Continued)

(52) U.S. Cl.
CPC ......... *G06Q 50/12* (2013.01); *G06Q 10/0832* (2013.01); *G06Q 30/0633* (2013.01); *H05B 6/6441* (2013.01)

(58) Field of Classification Search
CPC .............. G06Q 50/12; G06Q 10/0832; G06Q 30/0633; H05B 6/6441
See application file for complete search history.

(56) References Cited

U.S. PATENT DOCUMENTS 4,450,757 A * 5/1984 Alfio ....................... A47J 27/18
126/374.1
4,548,130 A * 10/1985 Diener .................. A47J 37/045
222/166
(Continued)

FOREIGN PATENT DOCUMENTS

CN 104112202 A 10/2014
CN 104778191 A 7/2015
(Continued)

OTHER PUBLICATIONS

International search report of PCT Patent Application No. PCT/CN2017/097339 dated Mar. 23, 2018.

*Primary Examiner* — Talia F Crawley

(57) ABSTRACT

The present disclosure provides a method for implementing O2O catering operation, a server and a smart cooking device. The method is applied to a server and includes: receiving a recipe uploaded from a merchant terminal; sending the recipe to at least one client terminal; receiving at least one order information sent from the at least one client terminal; decomposing and combining the at least one order information to obtain combined food material information, where the combined food material information includes the food material information obtained by combining same types of food materials in the received at least one order information; sending the at least one order information (Continued)

and the combined food material information to the merchant terminal; and sending an order recipe to a smart cooking device.

5 Claims, 4 Drawing Sheets

(51) Int. Cl.
    *A47J 27/18*           (2006.01)
    *G06Q 50/12*          (2012.01)
    *G06Q 10/08*          (2012.01)
    *G06Q 30/06*          (2012.01)
    *H05B 6/64*           (2006.01)

(56) References Cited

U.S. PATENT DOCUMENTS

2016/0140526 A1*   5/2016   Cummins ............ G06Q 20/308
                                                                705/28
2016/0235239 A1*   8/2016   Patadia ............... A47J 27/0802

FOREIGN PATENT DOCUMENTS

| CN | 104950712 A | 9/2015 |
|---|---|---|
| CN | 106539483 A | 3/2017 |
| CN | 106618160 A | 5/2017 |
| JP | 2003150847 A | 5/2003 |

\* cited by examiner

METHOD FOR IMPLEMENTING O2O CATERING OPERATION, SERVER AND SMART COOKING DEVICE

CROSS-REFERENCES TO RELATED APPLICATION

This application is the International Application No. PCT/CN2017/097339 for entry into US national phase with an international filing date of Aug. 14, 2017 designating US, now pending, and claims priority to Chinese Patent Application 201710487734.0, filed on Jun. 23 2017, the content of which is incorporated herein by reference in its entirety.

BACKGROUND

Technical Field

The present disclosure relates to the technical field of catering services, and in particular relates to a method of implementing O2O catering operation, a server and a smart cooking device.

Related Art

With the rapid development of society, people's life has become faster and faster, and people's demand for quality of life has become stronger. Catering is an indispensable part of life. Nowadays, quite a few people don't have time to cook or don't know how to cook. When people want to dine at home, it only can be solved by ordering delivery. However, as the takeout food need to be delivered over a certain distance and time, the temperature and the taste of the food will be affected. Besides, the hygienic condition of the takeout restaurant cannot be guaranteed, therefore people who don't have time to cook or don't know how to cook cannot enjoy hygienic and delicious food at home.

SUMMARY

In view of this, in the embodiments of the present disclosure, it is provided a method for implementing O2O catering operation, a server, and a smart cooking device, so as to solve problem that people who don't have time to cook or don't know how to cook cannot enjoy hygienic and delicious food at home due to the defects in the existing ordering system.

According to a first aspect of embodiments of the present disclosure, it is provided a method for implementing O2O catering operation, where the method is applied to a server and includes:

receiving a recipe uploaded from a merchant terminal;
sending the recipe to at least one client terminal;
receiving at least one order information sent from the at least one client terminal, wherein the order information includes food material information and delivery time information;

decomposing and combining the at least one order information to obtain combined food material information, wherein the combined food material information includes the food material information obtained by combining same types of food materials in the received at least one order information;

sending the at least one order information and the combined food material information to the merchant terminal, so that the at least one order information and the combined food material information are known by the merchant from the merchant terminal to pre-process the food materials according to the at least one order information and the combined food material information, distributing the pre-processed food materials into material boxes and the delivering the material boxes to at least one client according to the at least one order information; and sending an order recipe to a smart cooking device such that the smart cooking device cooks the food materials from the material boxes according to the order recipe, wherein the order recipe includes a recipe corresponding to a respective one of the at least one order information.

Optionally, the step of decomposing and combining the at least one order information to obtain combined food material information includes:

decomposing all of the at least one order information at a predetermined time to obtain at least one food material information corresponding to the at least one order information respectively, and combining same types of food materials in the at least one food material information corresponding to all of the at least one order information to obtain the combined food material information.

Optionally, the step of sending the at least one order information and the combined food material information to the merchant terminal includes:

selecting at least one material box according to the at least one order information, and sending the at least one order information, the combined food material information and information of the at least one material box to the merchant terminal, wherein the at least one material box is adapted to the smart cooking device, and the information of the material box includes information of at least one type of at least one material box corresponding to at least one type of the at least one food material in the order information.

Optionally, the step of sending the at least one order information and the combined food material information to the merchant terminal includes:

sending the at least one order information and the combined food material information of at least one order that needs to be delivered during a preset time period to the merchant terminal.

According to a second aspect of embodiments of the present disclosure, it is provided a server which includes:

a recipe receiving unit configured to receive a recipe uploaded from a merchant terminal;
a recipe sending unit configured to send the recipe to at least one client terminal;
an order receiving unit configured to receive at least one order information sent from the at least one client terminal, wherein the order information includes food material information and delivery time information;
an order processing unit configured to decompose and combine the at least one order information to obtain combined food material information, wherein the combined food material information includes the food material information obtained by combining same types of food materials in the received at least one order information;
an information sending unit configured to send the at least one order information and the combined food material information to the merchant terminal, so that the at least one order information and the combined food material information are known by the merchant from the merchant terminal to pre-process the food materials according to the at least one order information and the combined food material information, distributing the pre-processed food materials into material boxes and the delivering the material boxes to at least one client according to the at least one order information; and an order recipe sending unit configured to send an order recipe to a smart cooking device such that the smart cooking device cooks the food materials from the material boxes according to the order recipe, wherein the order recipe includes a recipe corresponding to a respective one of the at least one order information.

Optionally, the order processing unit is specifically configured to:

decompose all of the at least one order information at a predetermined time to obtain at least one food material information corresponding to the at least one order information respectively, and combine same types of food materials in the at least one food material information corresponding to all of the at least one order information to obtain the combined food material information.

Optionally, the information sending unit is specifically configured to:

select at least one material box according to the at least one order information, and send the at least one order information, the combined food material information and information of the at least one material box to the merchant terminal, wherein the at least one material box is adapted to the smart cooking device, and the information of the material box includes information of at least one type of at least one material box corresponding to at least one type of the at least one food material in the order information.

Optionally, the information sending unit is specifically configured to:

send the at least one order information and the combined food material information of at least one order that needs to be delivered during a preset time period to the merchant terminal.

According to a third aspect of embodiments of the present disclosure, it is provided a server which includes:

a user login unit configured to manage login statuses of users, wherein the user includes at least one client and at least one merchant;

an order management unit configured to manage at least one order information of the at least one client;

a device monitor unit configured to monitor operation of a smart cooking device;

a device management control unit configured to send an order recipe to the smart cooking device, and to control and manage the smart cooking device, wherein the order recipe includes a recipe corresponding to a respective one of the at least one order information;

a processed material payment settlement unit configured to manage settlement of processed material payment of the at least one client and calculation of balance;

a user information management unit configured to manage basic information of the users;

an stock management unit configured to manage stock information of the at least one merchant, and to update the stock information in real time according to the at least one order information and incoming goods conditions;

a working area status unit configured to manage and record readiness of the at least one order;

a recipe management unit configured to manage recipe information of the at least one merchant; and an operation management unit configured to manage user authorization.

According to a third aspect of embodiments of the present disclosure, it is provided a smart cooking device which includes:

a recipe obtain unit configured to obtain an order recipe from the server, wherein the order recipe includes a recipe corresponding to an order information;

a material feed control unit configured to feed food materials according to the order recipe at a corresponding time;

a water supply unit configured to add water into the food materials in the cooking according to the order recipe;

a stir control unit configured to stir the fed food materials according to the order recipe; and a heating control unit configured to heat the food materials according to the order recipe.

In the embodiment of the present disclosure, the server sends the recipe uploaded from the merchant terminals to the client terminal, decomposes and combines the order informations sent by the client terminals to obtain the combined food material information, sends the order informations and the combined food material information to the merchant terminal so that the merchant processes the food materials according to the order informations and the combined food information and delivers the material boxes to the clients, and finally the order recipe is sent to the smart cooking device so that the smart cooking device cooks the food materials from the material boxes according to the order recipe, thereby realizing that people who don't have time to cook or don't know how to cook can enjoy hygienic and delicious food at home and the merchant can pre-processes the food materials according to the combined food materials to improve the work efficiency of the merchants.

Compared with the prior art, some embodiments of the present disclosure have the beneficial effect that the server sends the recipe uploaded from the merchant terminals to the client terminal, decomposes and combines the order informations sent by the client terminals to obtain the combined food material information, sends the order informations and the combined food material information to the merchant terminal so that the merchant processes the food materials according to the order informations and the combined food information and delivers the material boxes to the clients, and finally the order recipe is sent to the smart cooking device so that the smart cooking device cooks the food materials from the material boxes according to the order recipe, thereby realizing that people who don't have time to cook or don't know how to cook can enjoy hygienic and delicious food at home and the merchant can pre-processes the food materials according to the combined food materials to improve the work efficiency of the merchants.

BRIEF DESCRIPTION OF THE DRAWINGS

In order to more clearly illustrate the technical solutions in the embodiments of the present disclosure, the drawings used in the embodiments or the prior art description will be briefly described below. It is obvious that the drawings in the following description are only some embodiments of the present disclosure. To those skilled in the art, other drawings may be obtained from these drawings without paying any creative effort.

DESCRIPTION OF THE EMBODIMENTS

In the following description, for the purposes of illustration rather than the description, specific details such as specific system structures, techniques, etc. will be described for a thorough understanding of embodiments of the present disclosure. It will be apparent to those skilled in the art that the present disclosure may be implemented in other embodiments without these specific details. In other embodiments, detailed descriptions for well-known systems, devices, circuits, and methods are omitted so as not to obscure the description of the present disclosure.

In order to explain the technical solutions described in the present disclosure, the following description will be made by way of specific embodiments.

Embodiment #1

Figure 1:
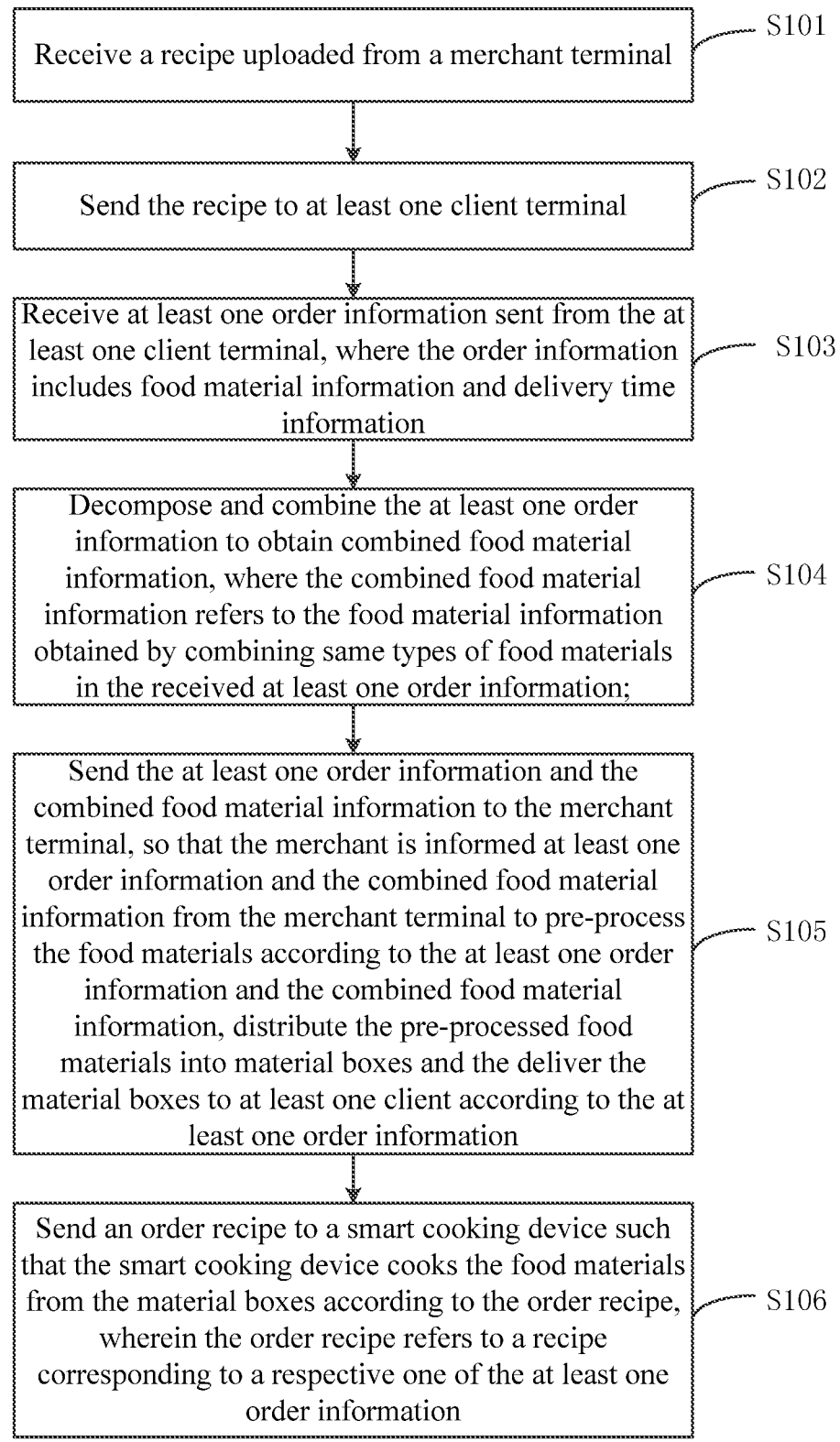
FIG. 1 is a flowchart of a method for implementing O2O catering operation according to a first embodiment of the present disclosure.

Please refer to FIG. 1, FIG. 1 is a flowchart of a method for implementing an O2O catering operation according to a first embodiment of the present disclosure, which includes the steps as follows.

In step S101, a recipe uploaded from a merchant terminal is received.

In the embodiment of the present disclosure, the recipe is entered into the merchant terminal by the merchant, the merchant terminal sends the recipe to the server, and the server receives the recipe uploaded by the merchant terminal. The recipe includes, but is not limited to, the name of the dish, the type of the food material, the weight of the food material, the method of cooking, and the nutritional information of the dish.

In step S102, the recipe is sent to at least one client terminal.

In the embodiment of the present disclosure, the merchant may further enter a booking time period and a delivery time period of the recipe in the merchant terminal, the server receives the booking time period and the delivery time period of the recipe uploaded from the merchant terminal and sends the booking time period and the delivery time period of the recipe to the at least one client terminal. For example, the booking time period of the recipe may be set from 9:00 am to 11:00 pm by the merchant and during this time period the orders can be received, and the delivery time period may be set from 11:30 to 2:00 and the orders will be delivered during this time period.

In step S103, at least one order information sent from the at least one client terminal is received, where the order information includes food material information and delivery time information.

In the embodiment of the present disclosure, the server sends the received recipe to the client terminal, the client places an order according to the recipe in the client terminal and the order is sent to the server, and the server receives the order information sent from the client terminal. The order information includes the food material information and the delivery time information. The food material information includes the types and weights of the food materials included in the order of the client, and the delivery time information includes the delivery time specified by the client. The delivery time may be a delivery time period. For example, if the scrambled eggs with tomatoes is selected according to the recipe in the client terminal and the delivery time is selected from 11:00 am to 11:30 am by the client, the order information includes all food materials required for the scrambled eggs with tomatoes, the corresponding weights of respective food materials and the delivery time.

In step S104, the at least one order information is decomposed and combined so that the combined food material information is obtained. The combined food material information includes the food material information obtained by combining same types of food materials in the received at least one order information.

In the embodiment of the present disclosure, the server decomposes the received at least one order information so as to obtain the food material information corresponding to respective order information, and then combines the same types of food materials in all food material informations so as to obtain the combined food material information. For example, the order of the client 1 is scrambled eggs with tomatoes, the order of the client 2 is stewed beef brisket with tomato. After receiving the order informations of the client 1 and client 2, the server decomposes the order informations of the client 1 and the client 2 to obtain the types and the weights of the food materials corresponding to the order informations of client 1 and client 2 respectively. Since both food material informations of the client 1 and the client 2 include tomatoes, the weight of the tomatoes required by the client 1 and the weight of the tomatoes required by the client 2 are combined so that the total weigh of the tomatoes can be obtained, and the combined food material information includes tomatoes and its weight, beef brisket and its weight, eggs and its weight and other ingredients. By combining the same types of food materials, the food materials can be processed in batches by the merchant and the efficiency of food processing can be improved.

Optionally, all of the received order informations are decomposed at a predetermined time so that the food material informations corresponding to the respective order informations are obtained, and then the same types of food materials in all food material informations are combined so that the combined food material information are obtained. For example, the server decomposes all the received order informations at eleven o'clock in the morning to obtain the food material informations corresponding to the respective order informations, and combines the same types of the food materials in the food material informations to obtain the combined food material information.

Optionally, the order informations received within the preset time interval are decomposed every preset time to obtain the food material informations corresponding to the respective order informations received at the preset time interval. And the same types of all food materials corresponding to the received respective order informations received within the preset time interval are merged to obtain the combined food material information. The preset time refers to a preset time interval at which the server decomposes and combines the order informations. For example, every half hour the server decomposes the order informations received within this time interval to obtain the food material informations corresponding to the respective order informations received within the half hour interval, and combines the same types of food materials in the food material informations to get the combined food material information.

Optionally, the informations of the orders that need to be delivered within the preset time period is decomposed so that the food material informations corresponding to the informations of the respective orders that need to be delivered within the preset time period are obtained, and the same types of food materials in the food material informations corresponding to the informations of the respective orders that needs to be delivered within the preset time period are combined so that the combined food material information is obtained. The server selects the order informations that need to be delivered within the preset time period. For example, the server selects the order informations that need to be delivered within the time period from 11:00 to 12:00, decomposes the informations of the orders that need to be delivered within this time period to obtain the food material informations corresponding to the informations of the respective orders that need to be delivered during this time period, and combines the same types of food materials in the food material informations to obtain the combined food material information. The preset time period may be a plurality of non-overlapping time periods. The server preferentially decomposes and combines the informations of the orders that need to be delivered within an earlier preset time period in the plurality of non-overlapping time periods. For example, the preset time period may be from ten to eleven, from eleven to twelve, and from twelve to one, and the server preferentially decomposes and combines the informations of the orders that need to be delivered within the time period from ten to eleven, then decomposes and combines the informations of the orders that need to be delivered within the time period from eleven to twelve, and finally decomposes and combines the informations of the orders that needs to be delivered within the time period from twelve to one.

In step S105, the at least one order information and the combined food material information are sent to the merchant terminal, so that the merchant is informed at least one order information and the combined food material information from the merchant terminal to pre-process the food materials according to the at least one order information and the combined food material information, distribute the pre-processed food materials into material boxes and the deliver the material boxes to at least one client according to the at least one order information.

In the embodiment of the present disclosure, the server sends the order informations and the combined food material information to the merchant terminal, the merchant is informed the order informations and the combined food material information from the merchant terminal to pre-process the food materials according to the order informations and the combined food material information. The pre-propessing includes but not limited to purchasing, cleaning, disinfecting, cutting and pickling. And then the food materials are distributed into material boxes according to the order informations of the respective clients. For example, if the order of a client is scrambled eggs with tomatoes, the relevant food materials in the order information are respectively distributed in the material boxes according to their respective weights, and finally the material boxes are delivered to the client. Pre-processing the food materials according to the order information and the combined food material information includes purchasing, cleaning and sterilizing the food materials according to the combined food material information, and dividing and/or pickling the food materials according to the order information. Thus the food materials can be processed in batches, and the requirements of different order informations for the food materials can be satisfied.

Optionally, the server receives the amount of the stock of food materials uploaded from the merchant terminal. The server determines whether the amount of the stock is sufficient according to the total amount of the various types of food materials in the combined food material information and the amount of the stock of food materials. If the amount of the stock is insufficient, a purchase order is generated. The purchase order includes the types and amounts of the food materials to be purchased.

Optionally, the material boxes are selected according to the order informations and the combined food material information. The order informations, the combined food material information and the information of material boxes are sent to the merchant terminal, where the material boxes are adapted to the smart cooking device. The information of material boxes refers to types of the material boxes corresponding to the types of the food materials in the order informations. The server selects different material boxes according to various food materials in the order informations, and sends the types of the material boxes to the merchant terminal. For example, the order information of the client includes scrambled eggs with tomatoes, when selecting material boxes, the box for condiment is selects as the box type 1, the box for tomatoes is selected as the box type 2, the box for eggs is selected as the box type 3, and the informations of the material boxes is sent to the merchant terminal. When the merchant distributes the food materials into boxes, corresponding food materials are distributed into the corresponding boxes. The material boxes are used with the smart cooking device. During the cooking process, the smart cooking device selects the food materials to be cooked by identifying the types of the material boxes.

Optionally, the order informations and the combined food material information of the orders that need to be delivered during a preset time period are sent to the merchant terminal. The server sends the order informations and the combined food information of the orders that need to be delivered during the preset time period to the merchant terminal. For example, in the morning, the server only sends the order information and the combined food information of the orders that need to be delivered in the morning to the merchant terminal, and the orders that need to be delivered in the afternoon are not processed, so that in the morning the merchant only needs to process the orders that need to be delivered in the morning to increase the efficiency and ensure that clients receive fresh food materials.

In step S106, the order recipe is sent to the smart cooking device, so that the smart cooking device cooks the food materials from the material boxes according to the order recipe, where the order recipe includes the recipe corresponding to the order information.

In the embodiment of the present disclosure, after receiving the material boxes delivered by the merchant, the client puts the material boxes into the smart cooking device, the server sends the order recipe to the smart cooking device, and the smart cooking device receives the order recipe and cooks the food materials from the material boxes according to the order recipe. The smart cooking device may be a smart cooking robot. The material box may be provided with a QR code or barcode corresponding to the order recipe information, and the smart cooking device downloads the order recipe from the server by scanning the QR code or the barcode. Or the server sends the recipe uploaded by the merchant to the smart cooking device, and the smart cooking device selects the order recipe from the received recipes by scanning the QR code or the barcode. Or the merchant terminal downloads the order recipe from the server by scanning the QR code or the barcode, and then sends the order recipe to the smart cooking device. The working status of the smart cooking device is also fed back to the server in real time, and the server transmits the working status of the smart cooking device to the client terminal.

In the embodiment of the present disclosure, the server sends the recipe uploaded from the merchant terminals to the client terminal, decomposes and combines the order informations sent by the client terminals to obtain the combined food material information, sends the order informations and the combined food material information to the merchant terminal so that the merchant processes the food materials according to the order informations and the combined food information and delivers the material boxes to the clients, and finally the order recipe is sent to the smart cooking device so that the smart cooking device cooks the food materials from the material boxes according to the order recipe, thereby realizing that people who don't have time to cook or don't know how to cook can enjoy hygienic and delicious food at home and the merchant can pre-processes the food materials according to the combined food materials to improve the work efficiency of the merchants.

It should be understood that the sequence numbers of the steps in the above embodiments does not mean the order of execution. The order of execution of respective processes should be determined by their functions and internal logic, and the sequence numbers of the steps should not be construed as any limitation on the implementation process of the embodiments of the present disclosure.

Embodiment #2

Figure 2:
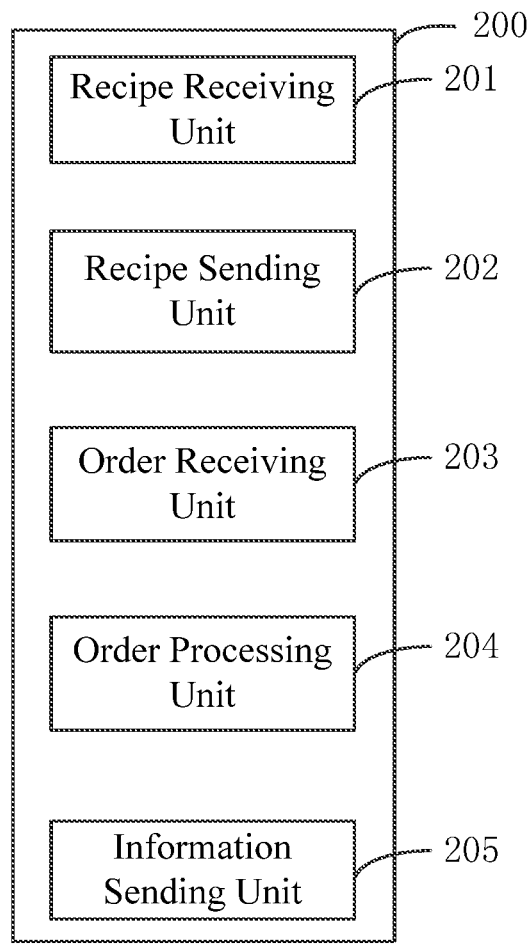
FIG. 2 is a block diagram of a server according to a second embodiment of the present disclosure.

Corresponding to the method of implementing O2O catering operation according to the first embodiment, FIG. 2 is a block diagram of a server according to an embodiment of the present disclosure. For the convenience of description, only the parts related to the embodiment of the present disclosure are shown.

Referring to FIG. 2, a server 200 includes a recipe receiving unit 201, a recipe sending unit 202, an order receiving unit 203, an order processing unit 204, an information sending unit 205 and an order recipe sending unit 206.

The recipe receiving unit 201 is configured to receive a recipe uploaded from a merchant terminal.

The recipe sending unit 202 is configured to send the recipe to at least one client terminal.

The order receiving unit 203 is configured to receive at least one order information sent from the at least one client terminal, wherein the order information includes food material information and delivery time information.

The order processing unit 204 is configured to decompose and combine the at least one order information to obtain combined food material information, where the combined food material information includes the food material information obtained by combining same types of food materials in the received at least one order information.

The information sending unit 205 is configured to send the at least one order information and the combined food material information to the merchant terminal, so that the at least one order information and the combined food material information are known by the merchant from the merchant terminal to pre-process the food materials according to the at least one order information and the combined food material information, distributing the pre-processed food materials into material boxes and the delivering the material boxes to at least one client according to the at least one order information.

The order recipe sending unit 206 is configured to send an order recipe to a smart cooking device such that the smart cooking device cooks the food materials from the material boxes according to the order recipe, where the order recipe includes a recipe corresponding to a respective one of the at least one order information.

Optionally, the order processing unit 204 is specifically configured to decompose all of the at least one order information at a predetermined time to obtain at least one food material information corresponding to the at least one order information respectively, and combine same types of food materials in the at least one food material information corresponding to all of the at least one order information to obtain the combined food material information.

Optionally, the information sending unit 205 is specifically configured to select at least one material box according to the at least one order information, and send the at least one order information, the combined food material information and information of the at least one material box to the merchant terminal, where the at least one material box is adapted to the smart cooking device, and the information of the material box includes at least one type of at least one material box corresponding to at least one type of the at least one food material in the order information.

Optionally, the information sending unit 205 is specifically configured to send the at least one order information and the combined food material information of at least one order that needs to be delivered during a preset time period to the merchant terminal.

Embodiment #3

Figure 3:
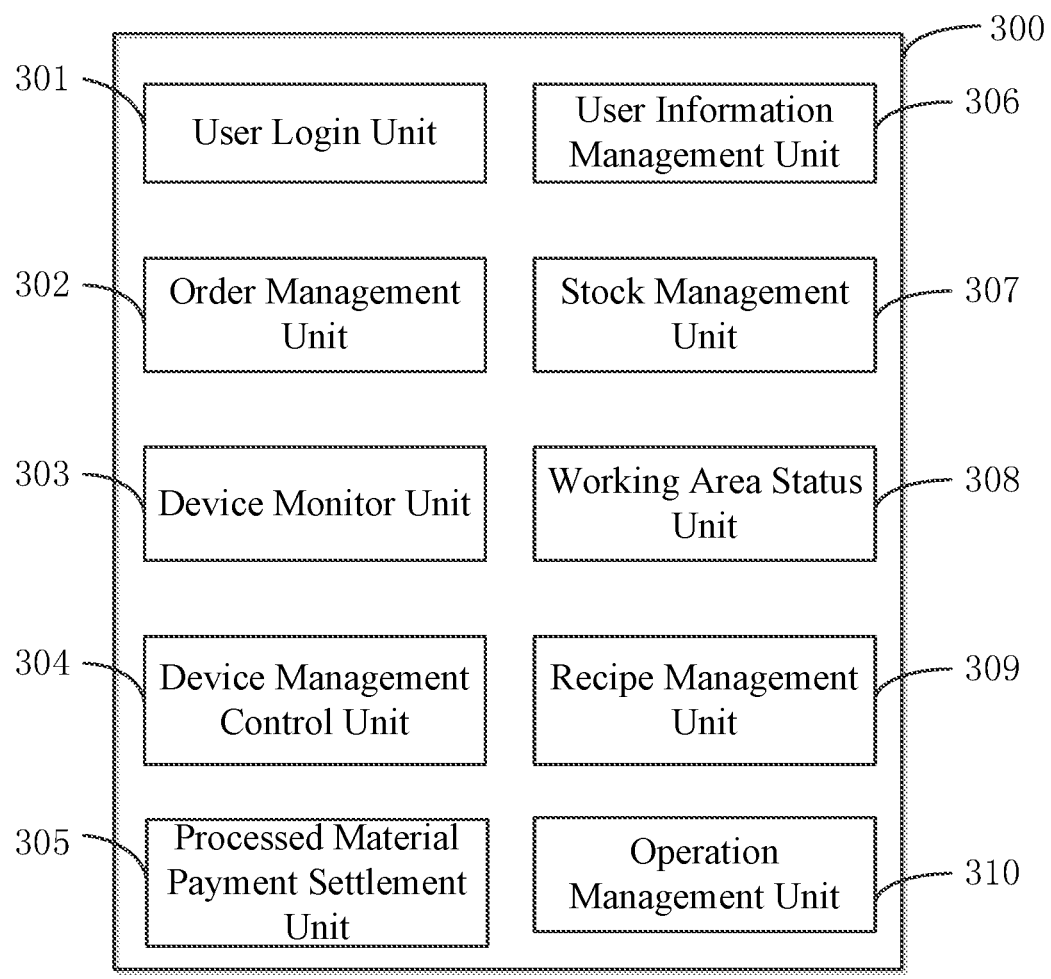
FIG. 3 is a block diagram of a server according to a third embodiment of the present disclosure.

Referring to FIG. 3, which is a block diagram of a server, the server 300 includes a user login unit 301, an order management unit 302, a device monitor unit 303, a device management control unit 304, a processed material payment settlement unit 305, a user information management unit 306, a stock management unit 307, a working area status unit 308, a recipe management unit 309 and an operation management unit 310.

The user login unit 301 is configured to manage login statuses of users, where the user includes at least one client and at least one merchant. Clients and merchants log in to the server by username and password, and users can perform operations such as registering accounts, canceling accounts, changing passwords, and modifying user names.

The order management unit 302 is configured to manage at least one order of the at least one client. Clients can add, delete, and query client orders.

The device monitor unit 303 is configured to monitor operation of a smart cooking device. The device monitor unit 303 monitors the operation of the smart cooking device, records the operation information, and sends the operation information to the client terminal for the convenience of the customer inquiry.

The device management control unit 304 is configured to send an order recipe to the smart cooking device, and to control and manage the smart cooking device, wherein the order recipe includes a recipe corresponding to a respective one of the at least one order information.

The processed material payment settlement unit 305 is configured to manage settlement of processed material payment of the at least one client and calculation of balance.

The user information management unit 306 is configured to manage basic information of the users.

The stock management unit 307 is configured to manage stock information of food materials of the at least one merchant, and to update the stock information in real time according to the at least one order information and incoming goods conditions.

The working area status unit 308 is configured to manage and record readiness of the at least one order.

The recipe management unit 309 is configured to manage recipe information of the at least one merchant, which includes uploading the recipe, modifying the recipe, deleting the recipe, etc.

The operation management unit 310 is configured to manage user authorization.

Embodiment #4

Figure 4:
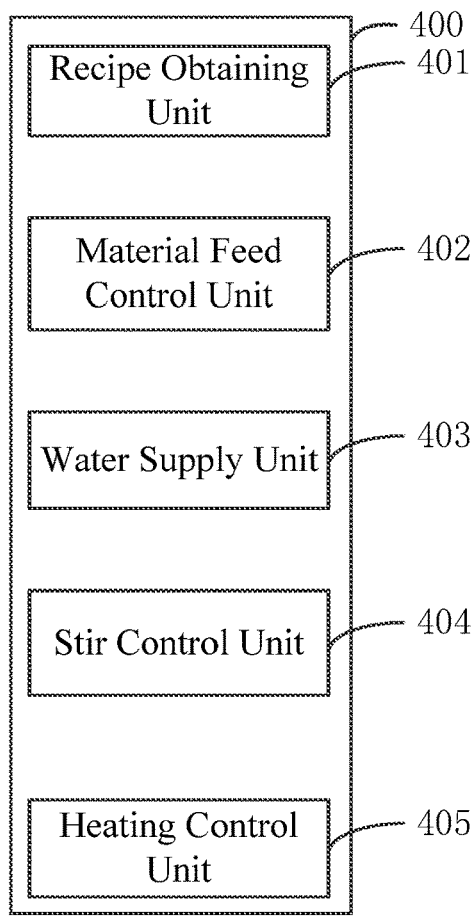
FIG. 4 is a block diagram of a smart cooking apparatus according to a fourth embodiment of the present disclosure.

Referring to FIG. 4, which is a block diagram of a smart cooking apparatus, the smart cooking apparatus 400 includes a recipe obtaining unit 401, a material feed control unit 402, a water supply unit 403, a stir control unit 404 and a heating control unit 405.

The recipe obtaining unit 401 is configured to obtain an order recipe from the server, where the order recipe includes a recipe corresponding to an order information.

The material feed control unit 402 is configured to feed food materials according to the order recipe at a corresponding time.

The water supply unit 403 is configured to add water into the food materials in the cooking according to the order recipe.

The stir control unit 404 is configured to stir the fed food materials according to the order recipe.

The heating control unit 405 is configured to heat the food materials according to the order recipe.

Embodiment #5

Figure 5:
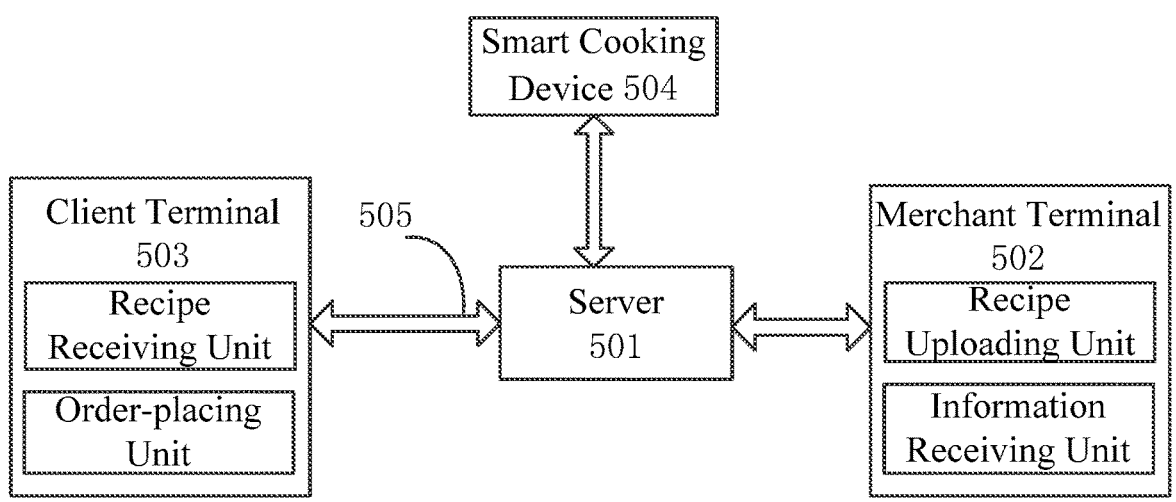
FIG. 5 is a schematic diagram of a system for implementing O2O catering operation according to a fifth embodiment of the present disclosure.

Referring to FIG. 5, which is a schematic diagram of a system of implementing an O2O catering operation, the system includes a server 501 according to embodiment #2, a merchant terminal 502, a client terminal 503 and a smart cooking device 504 according to the embodiment #4. The merchant terminal 502, the client terminal 503 and the smart cooking device 504 are connected to the server 501 via buses 505.

The merchant terminal 502 includes a recipe uploading unit and an information receiving unit. The recipe uploading unit is configured to upload the recipe to the server so that the server sends the recipe to the client terminal. The information receiving unit is configured to receive the order informations and the combined food material information sent from the server so that the merchant obtains the order informations and the combined food material information from the merchant terminal, pre-processes the food materials according to the combined food material information, distributing the food materials to material boxes, and deliver the material boxes to the client.

The client terminal 503 includes a recipe receiving unit and an order-placing unit. The recipe receiving unit is configured to receive a recipe sent by the server. The order-placing unit is configured to receive a client order and to send the order information to the server so that the server decomposes and combines the order informations to obtain the combined food material information, and send the order informations and the combined food information to the merchant terminal.

It can be clearly understood by the one of ordinary skill in the art that, for describing conveniently and concisely, dividing of the aforesaid various functional units, functional modules is described exemplarily merely, in an actual application, the aforesaid functions can be assigned to different functional units and functional modules to be accomplished, that is, an inner structure of a data synchronizing device is divided into functional units or modules so as to accomplish the whole or a part of functionalities described above. The various functional units, modules in the embodiments can be integrated into a processing unit, or each of the units exists independently and physically, or two or more than two of the units are integrated into a single unit. The aforesaid integrated unit can by either actualized in the form of hardware or in the form of software functional units. In addition, specific names of the various functional units and modules are only used for distinguishing from each other conveniently, but not intended to limit the protection scope of the present application. Regarding a specific working process of the units and modules in the aforesaid device, reference can be made to a corresponding process in the aforesaid method embodiments, it is not repeatedly described herein.

The ordinarily skilled one in the art may aware that, the elements and algorithm steps of each of the examples described in connection with the embodiments disclosed herein can be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present application.

It should be understood that, in the embodiments of the present application, the disclosed device/terminal device and method could be implemented in other ways. For example, the device described above are merely illustrative; for example, the division of the units is only a logical function division, and other division could be used in the actual implementation, for example, multiple units or components could be combined or integrated into another system, or some features can be ignored, or not performed. In another aspect, the coupling or direct coupling or communicating connection shown or discussed could be an indirect, or a communicating connection through some interfaces, devices or units, which could be electrical, mechanical, or otherwise.

The units described as separate components could or could not be physically separate, the components shown as units could or could not be physical units, which can be located in one place, or can be distributed to multiple network elements. Parts or all of the elements could be selected according to the actual needs to achieve the object of the present embodiment.

In addition, the various functional units in each of the embodiments of the present application can be integrated into a single processing unit, or exist individually and physically, or two or more than two units are integrated into a single unit. The aforesaid integrated unit can either be achieved by hardware, or be achieved in the form of software functional units.

If the integrated unit is achieved in the form of software functional units, and is sold or used as an independent product, it can be stored in a computer readable storage medium. Based on such understanding, the technical solution of the embodiments of the present invention in essence or the part of the technical solution contributing to the prior art, or all or part of the technical solution may be embodied in the form of a software product. The computer software product is stored in a storage medium and includes instructions for causing a computer device (which may be a personal computer, a server, or a network device, etc.) or a processor to perform all or part of the steps of the method according to the embodiments of the embodiments of the present invention. The storage medium includes a U disk, a mobile hard disk, a read-only memory (ROM), a random access memory (RAM), a magnetic disk, or an optical disk, and the like, which can store program code.

When the computer program is executed by the processor, the steps in the various method embodiments described above can be implemented. Wherein, the computer program comprises computer program codes, which can be in the form of source code, object code, executable documents or some intermediate form, etc. The computer readable medium can include: any entity or device that can carry the computer program codes, recording medium, USB flash disk, mobile hard disk, hard disk, optical disk, computer storage device, ROM (Read-Only Memory), RAM (Random Access Memory), electrical carrier signal, telecommunication signal and software distribution medium, etc.

As stated above, the aforesaid embodiments are only intended to explain but not to limit the technical solutions of the present application. Although the present application has been explained in detail with reference to the above-described embodiments, it should be understood for the ordinary skilled one in the art that, the technical solutions described in each of the above-described embodiments can still be amended, or some technical features in the technical solutions can be replaced equivalently; these amendments or equivalent replacements, which won't make the essence of corresponding technical solution to be broken away from the spirit and the scope of the technical solution in various embodiments of the present application, should all be included in the protection scope of the present application.

What is claimed is:

1. A method for implementing O2O catering operation, wherein the method is applied to a server and comprises:
receiving a recipe uploaded from a merchant terminal;
sending the recipe to at least one client terminal;
receiving at least one order information sent from the at least one client terminal, wherein the order information includes food material information and delivery time information;
decomposing all of the at least one order information at a predetermined time to obtain at least one food material information corresponding to the at least one order information respectively, and combining same types of food materials in the at least one food material information corresponding to all of the at least one order information to obtain the combined food material information;
selecting at least one material box according to the at least one order information, and sending the at least one order information, the combined food material information of at least one order that needs to be delivered during a preset time period and information of the at least one material box to the merchant terminal, wherein the at least one material box is adapted to the smart cooking device, and the information of the material box includes at least one type of at least one material box corresponding to at least one type of the at least one food material in the order information, so that the merchant is informed at least one order information and the combined food material information from the merchant terminal to pre-process the food materials according to the at least one order information and the combined food material information, distribute the pre-processed food materials into material boxes and the deliver the material boxes to at least one client according to the at least one order information; and
sending an order recipe to a smart cooking device such that the smart cooking device cooks the food materials from the material boxes according to the order recipe, wherein the order recipe includes a recipe corresponding to a respective one of the at least one order information.

2. A server, comprising:
a recipe receiving unit configured to receive a recipe uploaded from a merchant terminal;
a recipe sending unit configured to send the recipe to at least one client terminal;
an order receiving unit configured to receive at least one order information sent from the at least one client terminal, wherein the order information includes food material information and delivery time information;
an order processing unit configured to decompose all of the at least one order information at a predetermined time to obtain at least one food material information corresponding to the at least one order information respectively, and combine same types of food materials in the at least one food material information corresponding to all of the at least one order information to obtain the combined food material information;
an information sending unit configured to select at least one material box according to the at least one order information, and send the at least one order information, the combined food material information of at least one order that needs to be delivered during a preset time period and information of the at least one material box to the merchant terminal, wherein the at least one material box is adapted to the smart cooking device, and the information of the material box includes at least one type of at least one material box corresponding to at least one type of the at least one food material in the order information; and
an order recipe sending unit configured to send an order recipe to a smart cooking device such that the smart cooking device cooks the food materials from the material boxes according to the order recipe, wherein the order recipe includes a recipe corresponding to a respective one of the at least one order information.

3. A smart cooking device, comprising:
a recipe obtain unit configured to obtain an order recipe from the server, wherein the order recipe includes a recipe corresponding to an order information;
a material feed control unit configured to feed food materials according to the order recipe at a corresponding time;
a water supply unit configured to add water into the food materials in the cooking according to the order recipe;
a stir control unit configured to stir the fed food materials according to the order recipe; and
a heating control unit configured to heat the food materials according to the order recipe.

4. The method according to claim 1, wherein the step of pre-processing the food materials comprises purchasing, cleaning and sterilizing the food materials according to the at least one order information and the combined food material information.

5. The server according to claim 2, wherein the food materials are pre-processed in the way of purchasing, cleaning and sterilizing according to the at least one order information and the combined food material information send by the information sending unit.

* * * * *